(12) United States Patent
Wright

(10) Patent No.: US 10,369,393 B2
(45) Date of Patent: Aug. 6, 2019

(54) AIRCRAFT FIRE EXTINGUISHING WITH HEATED TUBING

(71) Applicant: The Boeing Company, Chicago, IL (US)

(72) Inventor: Robert S. Wright, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/800,472

(22) Filed: Nov. 1, 2017

(65) Prior Publication Data

US 2019/0126082 A1 May 2, 2019

(51) Int. Cl.
| A62C 33/00 | (2006.01) |
| A62C 3/08 | (2006.01) |
| A62C 37/36 | (2006.01) |
| B64D 45/00 | (2006.01) |
| A62C 37/44 | (2006.01) |
| F16L 53/38 | (2018.01) |

(52) U.S. Cl.
CPC ............... *A62C 33/00* (2013.01); *A62C 3/08* (2013.01); *A62C 37/04* (2013.01); *A62C 37/44* (2013.01); *B64D 45/00* (2013.01); *F16L 53/38* (2018.01); *B64D 2045/009* (2013.01)

(58) Field of Classification Search
CPC ........... A62C 3/0207; A62C 3/07; A62C 3/08; A62C 35/58; A62C 35/60; A62C 35/62; A62C 35/64; A62C 35/68; F16L 53/00; F16L 53/30; F16L 53/34; F16L 53/38
USPC ...................................... 169/16, 17
See application file for complete search history.

(56) References Cited

U.S. PATENT DOCUMENTS

| 1,087,136 | A | * | 2/1914 | Nutter et al. | ........ | A62C 35/605 |
| | | | | | | 169/5 |
| 1,229,071 | A | * | 6/1917 | Hammond | ........... | A62C 35/605 |
| | | | | | | 169/5 |
| 2,013,315 | A | * | 9/1935 | Pavelsky | ................. | F16L 53/30 |
| | | | | | | 138/35 |
| 4,214,147 | A | * | 7/1980 | Kraver | .................. | F28F 19/006 |
| | | | | | | 392/468 |
| 4,239,486 | A | * | 12/1980 | Gomez | ................... | F16L 53/30 |
| | | | | | | 432/225 |

(Continued)

OTHER PUBLICATIONS

"How do batteries work?" http://www.qrg.northwestern.edu/projects/vss/docs/power/2-how-do-batteries-work.html.*

(Continued)

*Primary Examiner* — Viet Le
(74) *Attorney, Agent, or Firm* — Duft & Bornsen, PC

(57) ABSTRACT

Systems and methods are provided for aircraft fire extinguishing with heated tubing. One example is a fire extinguishing system that includes a container configured to store a fire extinguishing agent, a tube configured to transport the fire extinguishing agent from the container to a compartment of the aircraft, and a valve configured to initiate a discharge of the fire extinguishing agent from the container and through the tube. The fire extinguishing system also includes a heating element thermally coupled with the tube, and a control member in a cockpit of the aircraft configured to direct the heating element to heat the tube prior to initiating the discharge of the fire extinguishing agent via the valve.

20 Claims, 6 Drawing Sheets

(56) References Cited

U.S. PATENT DOCUMENTS

| | | | | |
|---|---|---|---|---|
| 4,423,311 | A * | 12/1983 | Varney, Sr. | E03B 7/14 392/468 |
| 4,566,542 | A * | 1/1986 | Enk | A62C 3/08 137/266 |
| 7,805,947 | B2 * | 10/2010 | Moulebhar | F01D 21/003 60/39.163 |
| 8,336,636 | B2 * | 12/2012 | Lade | A62C 3/004 169/11 |
| 8,965,187 | B2 * | 2/2015 | Borgmeier | H05B 3/46 392/480 |
| 2004/0000408 | A1 * | 1/2004 | Mancini | A62C 35/60 169/13 |
| 2005/0092471 | A1 * | 5/2005 | Heise | E03B 7/12 165/142 |
| 2008/0223589 | A1 * | 9/2008 | Young | A62C 35/68 169/16 |
| 2009/0038809 | A1 * | 2/2009 | Sundholm | A62C 35/60 169/34 |
| 2009/0107558 | A1 * | 4/2009 | Quigley | F16L 11/12 137/15.01 |
| 2009/0184100 | A1 * | 7/2009 | Ohmi | C23C 14/22 219/270 |
| 2012/0168184 | A1 * | 7/2012 | Enk, Sr. | A62C 3/08 169/14 |
| 2012/0318537 | A1 * | 12/2012 | Ransom, Jr. | A62C 3/08 169/46 |
| 2013/0120162 | A1 * | 5/2013 | Stehman | B64D 45/00 340/945 |
| 2014/0158382 | A1 * | 6/2014 | Ferguson | A62C 3/08 169/46 |
| 2014/0209331 | A1 * | 7/2014 | Burkett | A62C 2/06 169/46 |
| 2014/0313061 | A1 * | 10/2014 | Gatsonides | G08B 17/00 340/963 |
| 2014/0352986 | A1 * | 12/2014 | Multer | A62C 35/60 169/16 |
| 2014/0353427 | A1 * | 12/2014 | Meckes | A62C 3/08 244/129.2 |
| 2015/0034342 | A1 * | 2/2015 | Seebaluck | A62C 37/44 169/61 |
| 2015/0121894 | A1 * | 5/2015 | Nilsson | F02C 7/25 60/779 |
| 2015/0217153 | A1 * | 8/2015 | Jones | A62C 3/08 169/62 |
| 2015/0258358 | A1 * | 9/2015 | Popp | A62C 3/08 169/46 |
| 2016/0096051 | A1 * | 4/2016 | Baker | A62C 3/08 169/46 |
| 2016/0176535 | A1 * | 6/2016 | Family | B64D 37/32 701/3 |
| 2016/0236024 | A1 * | 8/2016 | Hopfe | A62C 35/68 |
| 2016/0263410 | A1 * | 9/2016 | Enk, Sr. | A62C 5/02 |
| 2016/0368618 | A1 * | 12/2016 | Charlemagne | B64D 29/00 |
| 2017/0014655 | A1 * | 1/2017 | Gatsonides | B64C 19/00 |
| 2017/0088272 | A1 * | 3/2017 | Meis | B64D 11/04 |
| 2017/0106221 | A1 * | 4/2017 | Gatsonides | A62C 35/02 |
| 2017/0120089 | A1 * | 5/2017 | Fisher | A62C 3/002 |
| 2017/0361139 | A1 * | 12/2017 | Koreis | A62C 4/02 |
| 2018/0099169 | A1 * | 4/2018 | Lucas | A62C 3/08 |
| 2018/0162543 | A1 * | 6/2018 | Jojic | B64D 37/32 |
| 2018/0222598 | A1 * | 8/2018 | Surawski | B64D 37/32 |
| 2018/0236278 | A1 * | 8/2018 | Smith | A62C 2/04 |
| 2018/0250538 | A1 * | 9/2018 | Dirksmeier | A62C 3/07 |

OTHER PUBLICATIONS

"Multi-position switch" http://www.directindustry.com/industrial-manufacturer/multi-position-switch-118662.html.*

Omega Silicone Rubber Tubing Heaters; https://www.omega.com/pptst/GST; Oct. 27, 2017.

Watlow Freeflex Heated Tubing; https://esolutions.watlow.com.

* cited by examiner

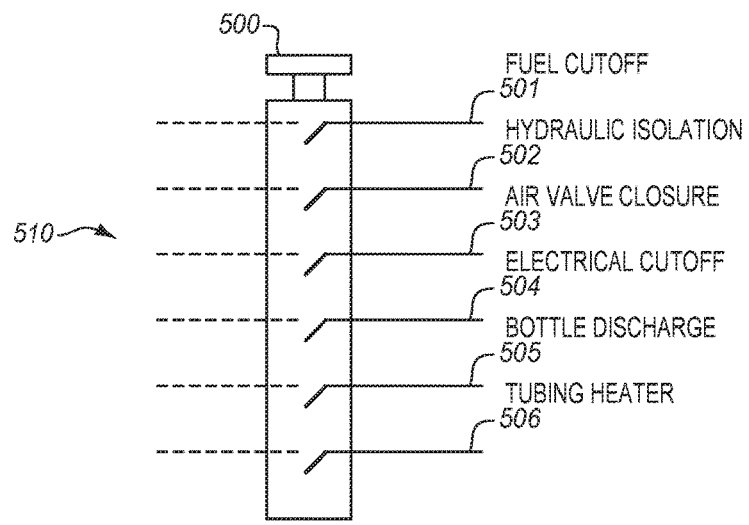
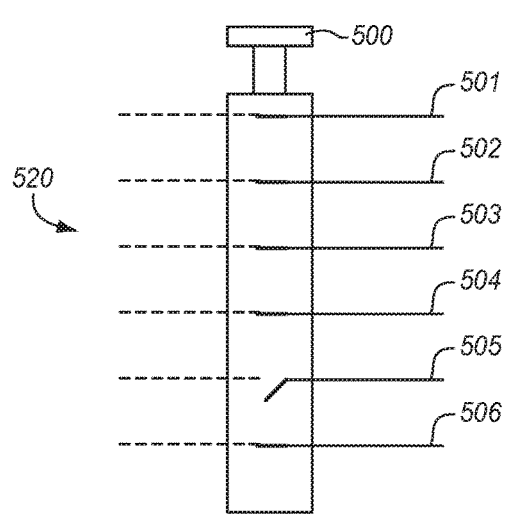
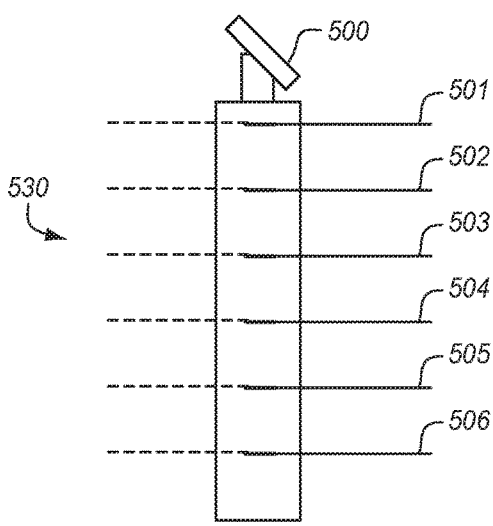

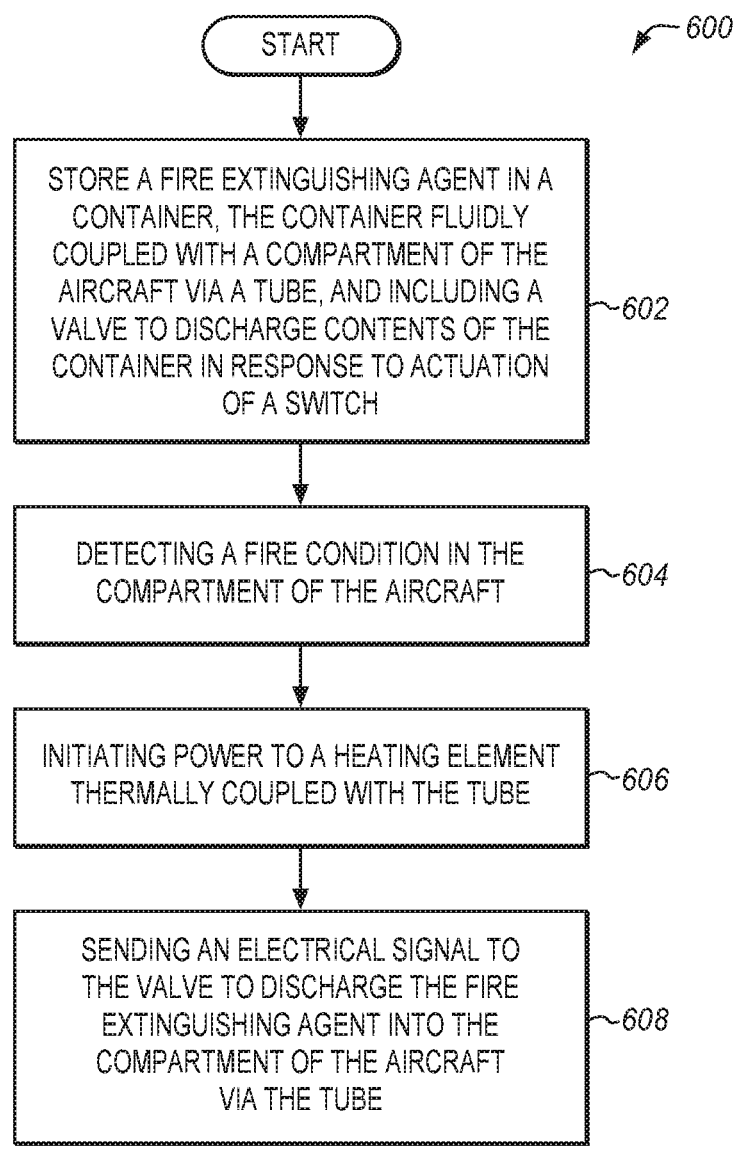

AIRCRAFT FIRE EXTINGUISHING WITH HEATED TUBING

FIELD

The disclosure relates to the field of aircraft, and in particular, to aircraft fire extinguishing.

BACKGROUND

An aircraft can be equipped with a fire extinguishing system to spray a chemical agent into an engine compartment to extinguish a fire. Traditional fire extinguishing agents, such as Halon 1301, discharge thoroughly at low temperatures and therefore are useful for aircraft fire extinguishing where the agent can be exposed to cold weather and high altitudes. However, these agents are currently being phased out. Replacement agents are available which are effective at extinguishing fires in many respects, but which do not perform as well as traditional agents in low temperatures. Therefore, aircraft manufacturers seek improved fire extinguishing performance in low temperatures.

SUMMARY

Examples described herein provide aircraft fire extinguishing with heated tubing. A heating element is thermally coupled with a tube that transports fire extinguishing agent from a container to an engine compartment of an aircraft. Prior to initiating agent discharge, a switch electrically couples the heating element to a battery of the aircraft (or another aircraft power source) to warm the tube. The heated tube is thus able to thoroughly disperse the agent, even at high altitudes and low temperatures.

One example is a fire extinguishing system that includes a container configured to store a fire extinguishing agent, a tube configured to transport the fire extinguishing agent from the container to a compartment of the aircraft, and a valve configured to initiate a discharge of the fire extinguishing agent from the container and through the tube. The fire extinguishing system also includes a heating element thermally coupled with the tube, and a control member in a cockpit of the aircraft configured to direct the heating element to heat the tube prior to initiating the discharge of the fire extinguishing agent via the valve.

In a further example, a vehicle, e.g., an aircraft, includes a fire extinguishing system with a thermally coupled heating element.

Another example is a method. The method includes storing a fire extinguishing agent in a container, wherein the container is fluidly coupled with a compartment of an aircraft via a tube, and wherein the container includes a valve to discharge contents of the container in response to actuation of a switch. The method also includes detecting a fire condition in the compartment of the aircraft, and initiating power to a heating element thermally coupled with the tube. After heating the tube with the heating element, the method includes sending an electrical signal to the valve to discharge the fire extinguishing agent into the compartment of the aircraft via the tube.

A further example includes a method for making a fire extinguishing system comprising thermally coupling a heat source to a tube fluidly connected with a compartment of a vehicle, and electrically coupling the heat source with a power source of the vehicle.

Yet another example includes a fire extinguishing system that includes a container to store a fire extinguishing agent, a switch electrically coupled with a valve of the container, a tube fluidly coupled with the container via the valve, and having a length from the valve to an engine compartment of the aircraft, and a heating element thermally coupled to a portion of the length of the tube, and electrically coupled with the switch. Movement of the switch to a first position actuates a power supply to the heating element to heat the tube. Movement of the switch from the first position to a second position actuates a discharge of the fire extinguishing agent from the container into the engine compartment of the aircraft.

Other examples (e.g., methods and computer-readable media relating to the foregoing examples) may be described below. The features, functions, and advantages that have been discussed can be achieved independently in various implementations or can be combined in yet other examples, further details of which can be seen with reference to the following description and drawings.

DESCRIPTION OF THE DRAWINGS

Some examples of the present disclosure are now described, by way of example only, and with reference to the accompanying drawings. The same reference number represents the same element or the same type of element on all drawings.

FIG. 5A illustrates a control member in a normal position in an illustrative example.

FIG. 5B illustrates a control member in a first position in an illustrative example.

FIG. 5C illustrates the control member in a second position in an illustrative example.

FIG. 6 is a flowchart of a method for initiating a fire extinguishing system of an aircraft in an illustrative example.

DESCRIPTION

The figures and the following description illustrate specific illustrative examples of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the examples described below, but by the claims and their equivalents.

Figure 1:
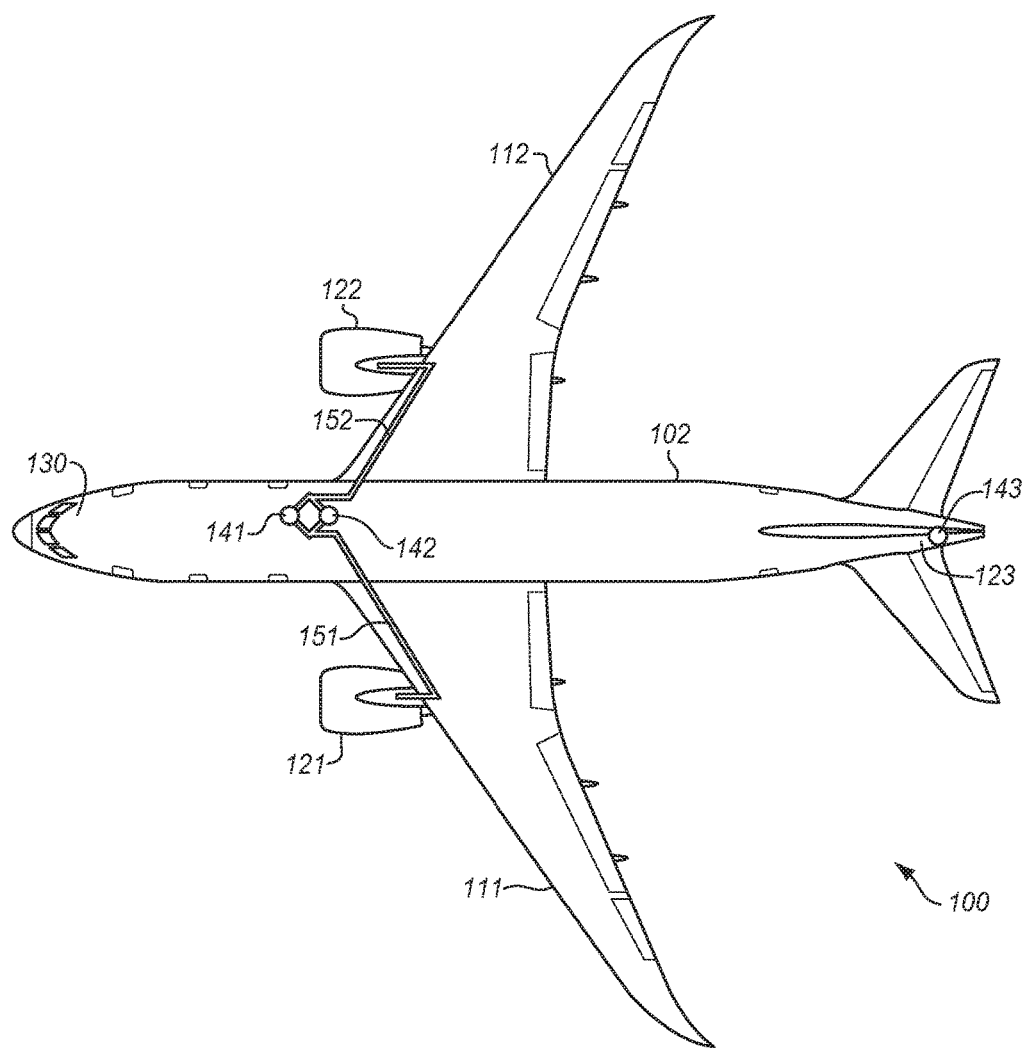
FIG. 1 is a diagram of an aircraft in the prior art.

FIG. 1 is a diagram of an aircraft 100 in the prior art. The aircraft 100 includes a fuselage 102, a left wing 111, a right wing 112, a left engine 121, and a right engine 122. Near the front of the fuselage 102, a cockpit 130 provides an instrument panel and flying controls for a pilot of the aircraft 100. Particularly, the cockpit 130 includes control members to direct one or more fire extinguisher containers 141-143 to release a chemical agent for suppressing fires. In general, the fire extinguisher containers 141-143 are installed or fixed to the aircraft 100 in contrast to portable fire extinguishing equipment such as a hand-held fire extinguisher.

In this example, the fire extinguisher containers 141-143 include two containers 141-142 installed near a wheel well of the aircraft 100 to discharge fire suppressing agent into the engine compartments 121-122 via tubes 151-152. A third fire extinguisher container 143 is provided to discharge fire suppressing agent into the Auxiliary Power Unit (APU) compartment 123 of the aircraft 100. The tubes 151-152 can include aluminum, steel, a combination thereof, or another material to transport the agent throughout the aircraft 100 including across portions of the wings 111-112. As such, the tubes 151-152 can, at some points, be exposed at or near the external environment outside the aircraft 100. Cold temperatures can thermally transfer from the tubes 151-152 to the agent and disturb the effectiveness and discharge of the agent into its intended compartment of the aircraft 100.

Figure 2:
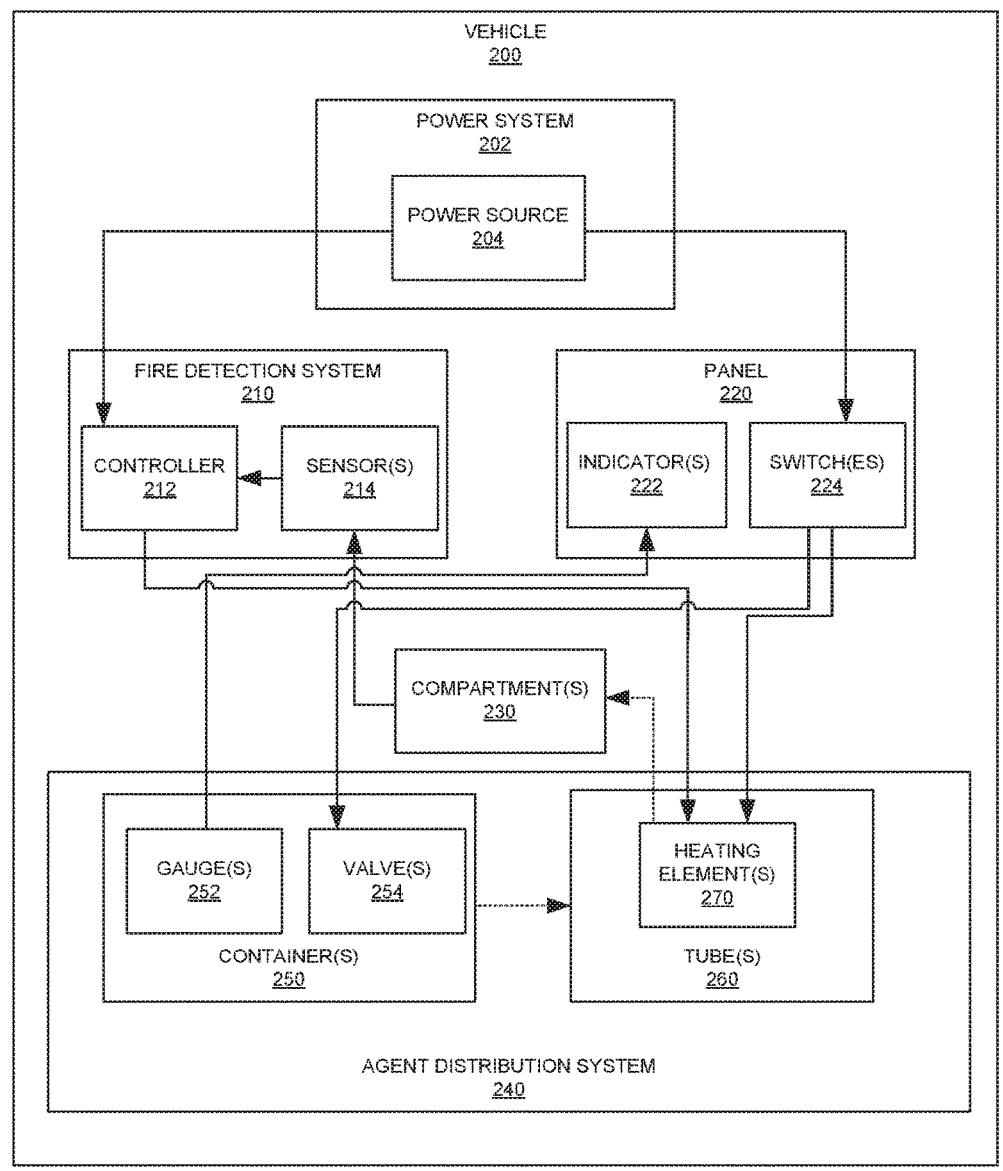
FIG. 2 illustrates a block diagram of a vehicle in an illustrative example.

FIG. 2 illustrates a block diagram of a vehicle 200 in an illustrative example. The vehicle can include system/components of the aircraft 100 described above or an alternative vehicle. The vehicle 200 includes a power system 202, a fire detection system 210, a fire extinguishing panel 220, one or more compartment(s) 230, and an agent distribution system 240. The fire detection system 210 includes one or more sensor(s) 214 operable to detect a fire condition in the compartment(s) 230 (e.g., one or more of the engine compartments 121-122, APU compartment 123, or another compartment of the vehicle 200), and to trigger a controller 212 to execute one or more actions in response.

The agent distribution system 240 includes one or more container(s) 250 to store fire extinguishing agent, each container 250 having one or more gauge(s) 252 and valve(s) 254. Each of the container(s) 250 can fluidly couple with one or more of the compartments 230 of the vehicle 200 via one or more tube(s) 260. The tubes 260 are enhanced to include one or more heating elements 270 operable to heat the tubes 260 in response to actuation by one or more switch(es) 224 on the fire extinguishing panel 220 (e.g., handheld switches in a cockpit of an aircraft) and/or by the controller 212 of the fire detection system 210 responding to fire detection. That is, the switches 224 and/or the controller 212 can selectively connect a power source 204 of the power system 202 to the heating elements 270 to initiate heat transfer to the tubes 260. The switches 224 can also actuate an opening of the valves 254 to cause the fire extinguishing agent to flow from the containers 250 to the compartments 230. The gauges 252 connect with one or more discharge indicator(s) 222 on the fire extinguishing panel 220 to indicate which of the containers 250 has discharged its agent. As such, the heating elements 270 can transfer heat to the tubes 260 prior to and/or during the flow of fire extinguishing agent in the tubes 260 to effectively disperse the agent in the compartments 230.

Figure 3:
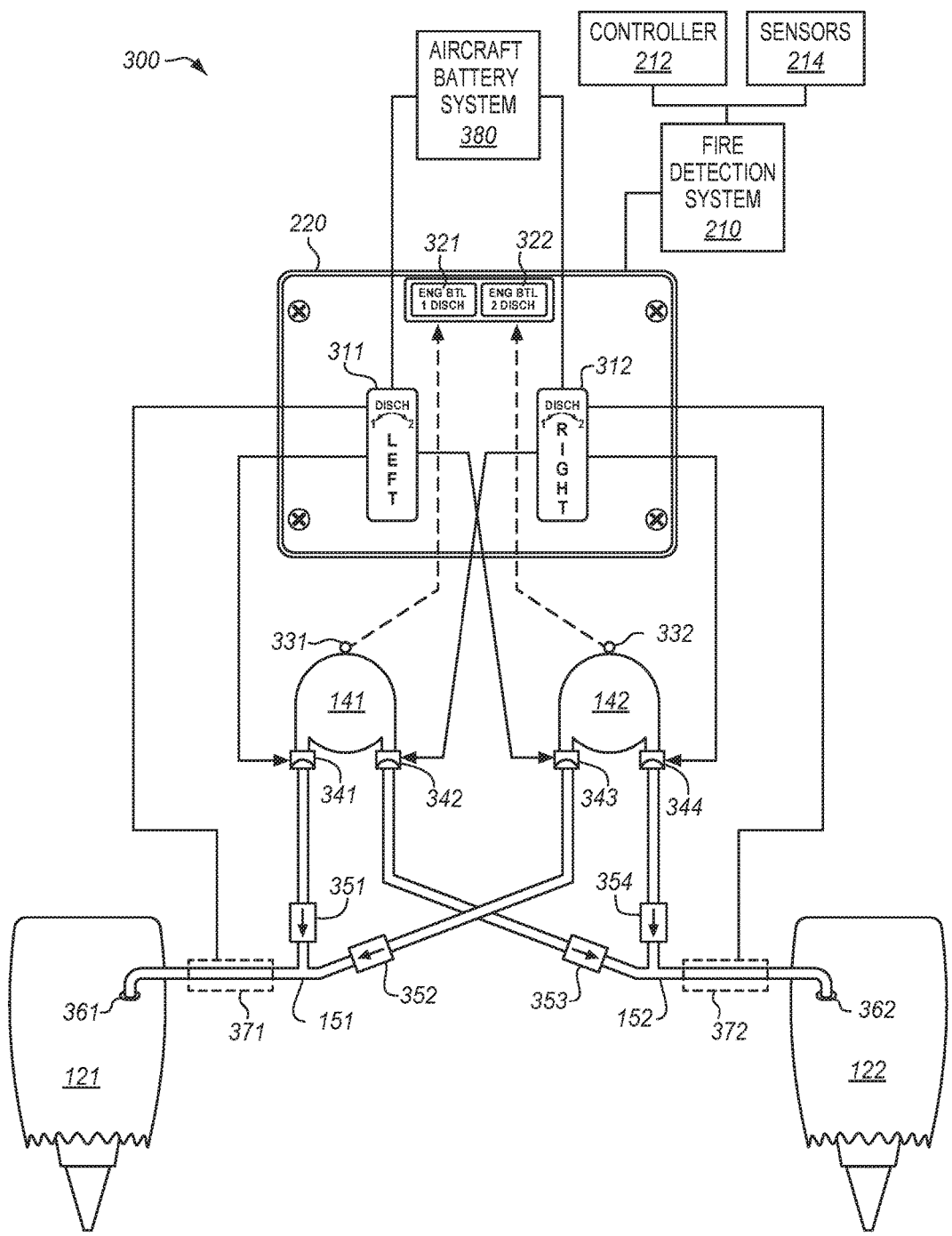
FIG. 3 illustrates an aircraft fire extinguishing system in an illustrative example.

FIG. 3 illustrates a fire extinguishing system 300 in an illustrative example. The fire extinguishing system 300 can be operable as an enhancement to the aircraft 100 described above or an alternative aircraft. The fire extinguishing system 300 includes a fire extinguishing fire extinguishing panel 220 (e.g., in the cockpit 130 of the aircraft 100) having a left switch 311, a right switch 312, a first discharge indicator 321, and a second discharge indicator 322. The fire extinguishing fire extinguishing panel 220 can also include and/or electrically couple with a fire detection system 210 of the aircraft including sensors 214 and/or warning indicators of a fire condition. If a pilot is informed by the fire detection system 210 that there is an engine fire, the pilot pulls the switches 311-312 upward to initiate a first series of actions (e.g., shutting down and isolating the engine compartments 121-122) and then rotates the pulled switch left or right to discharge the fire extinguisher containers 141-142. Gauges 331-332 installed on the fire extinguisher containers 141-142 can send an electrical signal to the discharge indicators 321-322 in response to a pressure drop that indicates the fire extinguisher containers 141-142 have discharged. As such, the applicable fire bottle discharge message can be displayed on the fire extinguishing fire extinguishing panel 220.

The fire extinguisher containers 141-142 each include one or more discharge valves 341-344 configured to initiate a discharge of the fire extinguishing agent into a tube connected with the discharge valves 341-344. The discharge valves 341-344 can be electrically coupled with the switches 311-312 to release the agent from the fire extinguisher containers 141-142 and into the engine compartments 121-122 via the tubes 151-152 in response to an actuation of one of the switches 311-312. As shown in FIG. 3, either or both of the fire extinguisher containers 141-142 can be discharged into either of the engine compartments 121-122. As such, check valves 351-354 can be installed near tubing junctions to prevent the agent remaining in one of the fire extinguisher containers 141-142 from backing up into one of the fire extinguisher containers 141-142 that has emptied its agent. The tubes 151-152 can have a total length in excess of ninety feet and, as described above, portions along the length of the tubes 151-152 can be exposed to cold temperatures before the agent reaches the outlets 361-362 that empty into the engine compartments 121-122.

The fire extinguishing system 300 is enhanced to include heating elements 371-372 thermally coupled with the tubes 151-152. The heating elements 371-372 can be positioned anywhere along the tubes 151-152 and each of the tubes 151-152 can be thermally coupled with one or more of the heating elements 371-372. In an example implementation, the heating elements 371-372 are positioned to transfer heat to the agent before it reaches the outlets 361-362 so that the agent effectively disperses in the engine compartments 121-122. The heating elements 371-372 activate in response to an actuation of the switches 311-312 to heat the tubes 151-152 prior to the discharge of agent. That is, the switches 311-312 are configured such that a first actuation (e.g., pulling) of the switches 311-312 electrically couples the heating elements 371-372 with an aircraft battery system 380 (or another power source of the aircraft 100) to heat the tubes 151-152 before a second actuation (e.g., rotating) of the switches 311-312 discharges the agent from the fire extinguisher containers 141-142 to the engine compartments 121-122 via the tubes 151-152.

Alternatively or additionally, the fire detection system 210 can activate the heating elements 371-372 in response to detecting a fire condition. The fire detection system 210 can include and/or connect with a controller 212 and one or more sensors 214 deployed in/around the engine compartments 121-122 (or alternative compartments of the aircraft 100). The controller 212 can direct the heating elements 371-372 to connect with an aircraft power source (e.g., aircraft battery system 380) to initiate heating of the tubes 151-152 in response to an alarm set off by the sensors 214 that monitor areas of the aircraft 100 for undesirable levels of heat, smoke, etc. For example, the controller 212 can direct the second heating element 372 to begin heating the second tube 152 in response to an alarm condition of one or more of the sensors 214 proximate to the right engine 122. As such, an alarm of the fire detection system 210 and/or an actuation of the switches 311-312 can trigger the heating elements 371-372 to heat the tubes 151-152 prior to discharge of agent. Although fire extinguishing system 300 is described herein with respect to pull/turn activation, it will be appreciated that alternative switch types and activation combinations are possible in connection with the examples described herein.

The heating elements 371-372 can be installed along portions of the tubes 151-152 exposed to cold temperatures and/or locations which are remote from personnel maintenance operations of the aircraft 100. The heating elements 371-372 can thermally couple with the tubes 151-152 at a variety of locations and in a variety of ways. For example, the heating elements 371-372 can include electric coils that surround the tube for a length of the tube, can include a thermal spray (e.g., nickel particles or another material) that creates a thermocouple with the tube, can be embedded with or inside the tube, can include electric coils in contact with a surface of the tube, etc.

Since the tubes 151-152 generally have thinner walls and a large surface area compared to that of the fire extinguisher containers 141-142, the configuration of the fire extinguishing system 300 described herein provides a technical benefit in that heat can be transferred to the agent quickly, efficiently, and at strategic locations throughout the aircraft 100 prior to a discharge event. Moreover, the configuration described herein advantageously heats the agent in an integrated fashion with current aircraft fire extinguishing procedures and enables the heat to transfer quickly at a location that coincides with an intended discharge location and at a timing preceding/coinciding with the discharge, enabling the agent to spray effectively at low temperatures with minimal power consumption of the aircraft battery system 380.

Still further, the increased temperatures of the tubes 151-152 counteracts the tendency of expanding gases through the tubes 151-152 to promote better vaporization of the agent upon its entering into a compartment of the aircraft (e.g., the engine compartments 121-122). As such, the fire extinguishing system 300 can use replacement agents that are alternative to Halon in an effective and efficient manner in any temperature condition without an increase in agent/container volume and corresponding weight increase in the aircraft. Examples of alternative agents which may be used, include but are not limited to, halomethane with a formula CF3I and Novec 1230 (ISO designation FK-5-1-12).

Figure 4A:
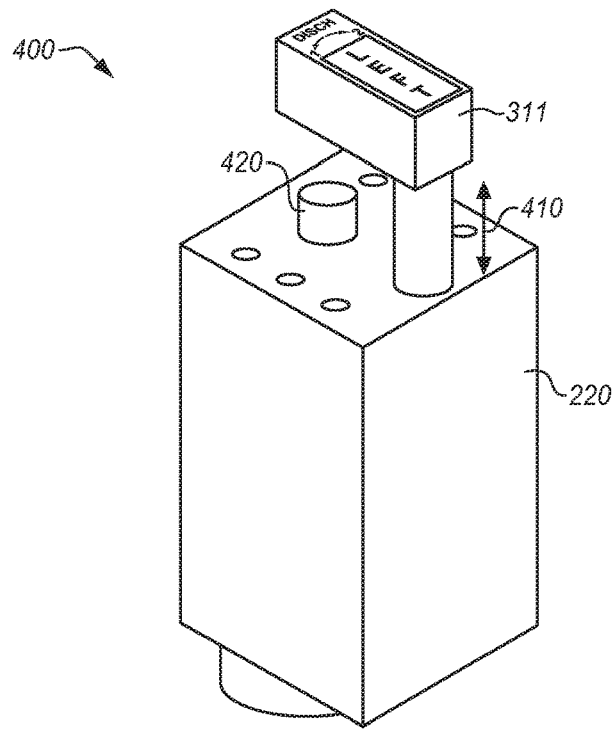
FIG. 4A is a perspective view of a left switch in an illustrative example.

FIG. 4A is a perspective view 400 of the left switch 311 in an illustrative example. The left switch 311 can normally be locked in the fire extinguishing fire extinguishing panel 220 by an electrical solenoid to prevent accidental activation of the fire extinguisher containers 141-142. In response to a fire signal provided by the engine fire detection system, the solenoid can open, allowing the left switch 311 to be pulled out along a first actuation direction 410 as shown in FIG. 4A. If the solenoid malfunctions, a manual override button 420 on the fire extinguishing fire extinguishing panel 220 underneath the left switch 311 can be provided which allows activation of the left switch 311. As described in greater detail below, when the left switch 311 is moved in the first actuation direction 410, a number of actions can be automatically performed in the aircraft 100, including a shut down and isolation of the left engine 121. Additionally, the first actuation of the left switch 311 can connect a first heating element 371 to the aircraft battery system 380 to heat a first tube 151 fluidly coupled with the first fire extinguisher container 141 and the left engine 121. Alternatively or additionally, the left switch 311 can power the first heating element 371 with another power system of an aircraft. In any case, heating can advantageously initiate along one or more portions of the first tube 151 thermally coupled with the first heating element 371. The right switch 312 can be similarly configured with a second heating element 372, the second tube 152, the second fire extinguisher container 142, the right engine 122, and the aircraft power source.

Figure 4B:
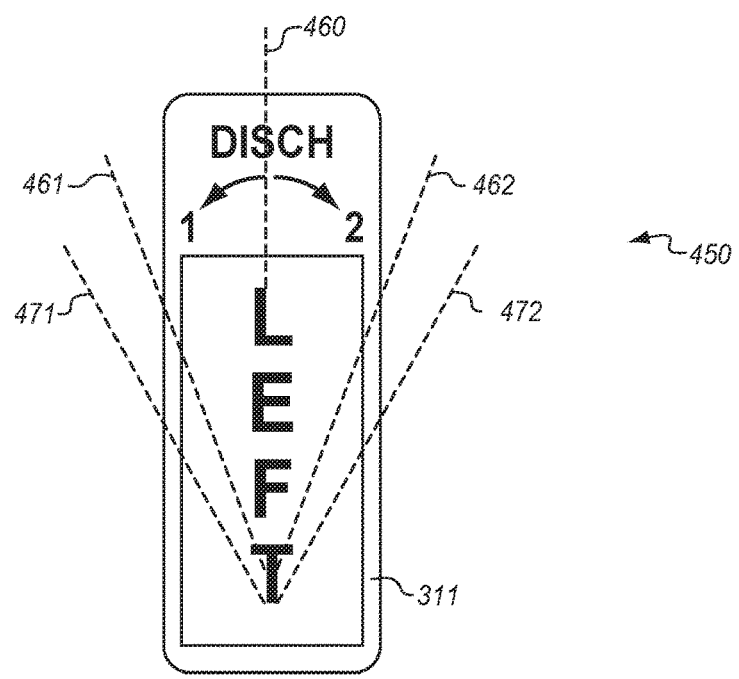
FIG. 4B is a top view of a left switch in an illustrative example.

FIG. 4B illustrates a top view 450 of the left switch 311 in an illustrative example. After being actuated in the first actuation direction 410 shown in FIG. 4A, the left switch 311 can be rotated from a center position 460 to either of two discharge positions 471-472. In particular, rotation of the left switch 311 past a first threshold point 461 toward a first discharge position 471 causes a closing of the left switch 311 and discharge of a first fire extinguisher container 141 into the left engine 121 via the first tube 151. And, rotation of the left switch 311 past a second threshold point 462 toward a second discharge position 472 causes a closing of the left switch 311 and discharge of a second fire extinguisher container 142 into the left engine 121 via the first tube 151. Since heating of the first tube 151 is initiated prior to rotation of the left switch 311, the agent can be sufficiently heated for effective dispersion as it enters the left engine 121. The right switch 312 can be similarly configured with the second heating element 372, the second tube 152, the second fire extinguisher container 142, and the right engine 122.

FIG. 5A illustrates a control member 500 (e.g., one of the switches 311-312) in a normal position 510 in an illustrative example. FIG. 5B illustrates the control member 500 in a first position 520 in an illustrative example. FIG. 5C illustrates the control member 500 in a second position 530 in an illustrative example. As shown in FIGS. 5A-C, the actuation position of the control member 500 operates electrical connections for fuel cutoff 501, hydraulic isolation 502, air valve closure 503, electrical cutoff 504, bottle discharge 505 (e.g., discharging of fire extinguisher containers 141-142), and tubing heat 506 (e.g., powering of the heating elements 371-372).

In activating from the normal position 510 to the first position 520 (e.g., a fire position), the control member 500 actuates connections for the fuel cutoff 501, the hydraulic isolation 502, the air valve closure 503, the electrical cutoff 504, and the tubing heat 506. A typical fire extinguishing procedure for an aircraft may include a delay before activating the control member 500 from the first position 520 to the second position 530 (e.g., a discharge position) to see if the fire detection system 210 of the aircraft indicates an improvement or suppression of fire conditions. During this time, one of the heating elements 371-372 electrically connected with the control member 500 can begin heating a surface of one of the tubes 151-152 in preparation for a discharge of agent. If the condition remains, the control member 500 can be moved to the second position 530 to actuate the connection for the bottle discharge 505. It can take approximately 6-10 seconds for the contents stored in a first of the fire extinguisher containers 141-142 to empty into an intended compartment of the aircraft.

Procedures may call for the pilot to wait for another delay at this point to see if the condition remains (e.g., as indicated by the fire detection system 210) after a period of time has passed after the first discharge (e.g., the discharge being indicated by one of the discharge indicators 321-322). If the condition remains, the connection for the bottle discharge 505 can be actuated a second time to discharge the contents stored in a second of the fire extinguisher containers 141-142 into the compartment of the aircraft. The heating elements 371-372 can be installed along the tubes 151-152 at locations that are downstream (i.e., in the direction of flow of the agent) from tubing junctions and/or the check valves 251-254 such that the tubes 151-152 heat at locations common to both of the fire extinguisher containers 141-142. For example, the second heating element 372 can initiate heating of the second tube 152 in response to the right switch 312 being actuated to a first position so that the second tube 152 transfers heat to the agent discharged from either of the fire extinguisher containers 141-142.

FIG. 6 is a flowchart of a method 600 for initiating a fire extinguishing system of an aircraft in an illustrative example. The steps of the method 600 will be described with reference to FIGS. 1-5, but those skilled in the art will appreciate that the method 600 can be performed in other systems. The steps of the flowchart(s) described herein are not all inclusive and may include other steps not shown.

In step 602, a container (e.g., the fire extinguisher containers 141-143) stores a fire extinguishing agent. As described above, the container can be fluidly coupled with a compartment (e.g., the engine compartments 121-122 or the APU compartment 123) of an aircraft (e.g., the aircraft 100) via a tube (e.g., the tubes 151-152). Also, the container can include a valve (e.g., the discharge valves 341-344) operable to discharge contents of the container in response to actuation of a switch (e.g., the switches 311-312).

In step 604, the fire detection system 210 detects a fire condition in the compartment of the aircraft. The fire detection system 210 and/or the fire extinguishing fire extinguishing panel 220 can include a warning light indicating a fire condition for a compartment of the aircraft. In response to detecting the fire condition, the switch corresponding with the compartment having the fire condition can be electrically unlocked via a signal sent from the fire detection system 210 and/or the fire extinguishing fire extinguishing panel 220 so that the switch can be pulled in an upward motion.

In step 606, the switch (e.g., the switches 311-312) initiates power to a heating element (e.g., the heating elements 371-372) thermally coupled with the tube. The power can be supplied via an electrical connection from the aircraft battery system 380 (or another power bus of the aircraft) to the heating element. A first actuating motion of the switch can actuate the connection between the aircraft battery system 380 and the heating element. Alternatively or additionally, the fire detection system 210 can actuate the connection between the heating element and the power source of the aircraft in response to detecting the fire condition in the compartment of the aircraft.

In step 608, the switch initiates the sending of an electrical signal to the valve to discharge the fire extinguishing agent into the compartment of the aircraft via the tube. The electrical signal can be sent via an electrical connection from the aircraft battery system 380 (or another power bus of the aircraft) to the valve. A second actuating motion of the switch can actuate the connection between the aircraft battery system 380 and the valve. Although examples herein are described with respect to the switches 311-312 of the fire extinguisher containers 141-142 and the engine compartments 121-122, it will be appreciated that the features of the fire extinguishing system 300 described above can be applicable to alternative aircraft compartments and to different component configurations of switches, containers, valves, tubes, and heating elements.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element can be implemented as instructions executable by a processor or a computer to perform the functions of the element. Some examples of instructions are software, program code, and firmware. The instructions are operational when executed by the processor to direct the processor to perform the functions of the element. The instructions can be stored on storage devices that are readable by the processor. Some examples of the storage devices are digital or solid-state memories, magnetic storage media such as a magnetic disks and magnetic tapes, hard drives, or optically readable digital data storage media.

Although specific examples are described herein, the scope of the disclosure is not limited to those specific examples. The scope of the disclosure is defined by the following claims and any equivalents thereof.

What is claimed is:

1. A fire extinguishing system of an aircraft, the fire extinguishing system comprising:
    a container configured to store a fire extinguishing agent;
    a tube configured to transport the fire extinguishing agent from the container to a compartment of the aircraft;
    a valve configured to initiate a discharge of the fire extinguishing agent from the container and through the tube;
    a heating element thermally coupled with the tube; and
    a control member configured to actuate to a first position and a second position to respond to a fire condition in the aircraft, wherein actuation of the control member to the first position activates the heating element to initiate drawing power from a power source of the aircraft to begin heating the tube and refrains from activating the valve to prevent discharging the fire extinguishing agent through the tube, and wherein actuation of the control member from the first position to the second position activates the valve to discharge the fire extinguishing agent through the heated tube.

2. The fire extinguishing system of claim 1 wherein:
    the control member is configured, in response to being moved from a normal position to the first position, to direct an isolation of an engine of the aircraft, and to direct the heating element to heat the tube for a period of time after the control member is moved to the first position; and
    the control member is configured, in response to being moved from the first position to the second position, to direct the valve to discharge the fire extinguishing agent from the container and through the tube after the tube is heated for the period of time.

3. The fire extinguishing system of claim 1 wherein:
    the control member is configured to actuate a connection of the heating element to a battery of the aircraft to heat the tube.

4. The fire extinguishing system of claim 1 wherein:

the heating element is thermally coupled with the tube at a portion of the tube that is exposed to an environment outside the aircraft.

5. The fire extinguishing system of claim 1 wherein:

the valve connects the container and the tube; and the tube includes a first end connected to the valve and a second end that terminates at the compartment of the aircraft.

6. The fire extinguishing system of claim 1 further comprising:

a sensor configured to detect a fire condition in the compartment of the aircraft; and a controller configured to direct the heating element to heat the tube in response to detecting the fire condition.

7. The fire extinguishing system of claim 1 wherein:

the heating element includes electric coils that surround the tube for a length of the tube.

8. The fire extinguishing system of claim 1 wherein:

the control member is electrically coupled with the valve and the heating element.

9. The fire extinguishing system of claim 1 wherein:

the heating element is embedded in the tube.

10. A method comprising:

storing a fire extinguishing agent in a container, wherein the container is fluidly coupled with a compartment of an aircraft via a tube, and wherein the container includes a valve to release the fire extinguishing agent from the container; and responsive to detecting a fire condition in the compartment of the aircraft, actuating a control member in a cockpit of the aircraft to a first position and a second position, wherein actuation of the control member to the first position activates a heating element to initiate drawing power from a power source of the aircraft to begin heating the tube and refrains from activating the valve to prevent discharging the fire extinguishing agent through the tube, and wherein actuation of the control member from the first position to the second position activates the valve to discharge the fire extinguishing agent into the compartment of the aircraft via the heated tube.

11. The method of claim 10 further comprising:

heating the tube by connecting the heating element to a power bus of the aircraft in response to detecting the fire condition in the compartment of the aircraft.

12. The method of claim 10 further comprising:

heating the tube by connecting the heating element to a battery of the aircraft.

13. The method of claim 10 further comprising:

thermally coupling the heating element with the tube via electric coils in contact with a surface of the tube.

14. The method of claim 10 further comprising:

in response to moving the control member from a normal position to the first position:

actuating an isolation of an engine of the aircraft; and actuating the heating element to heat the tube.

15. The method of claim 14 further comprising:

in response to moving the switch in the cockpit of the aircraft from the first position to the second position:

actuating the valve to discharge the fire extinguishing agent from the container through the heated tube and into an engine compartment of the aircraft.

16. A system comprising:

a fire extinguishing system of an aircraft, the fire extinguishing system including:

a container to store a fire extinguishing agent;

a switch electrically coupled with a valve of the container;

a tube fluidly coupled with the container via the valve, and having a length from the valve to an engine compartment of the aircraft; and a heating element thermally coupled to a portion of the length of the tube, and electrically coupled with the switch;

wherein movement of the switch to a first position actuates a power supply to the heating element to begin heating the tube and refrains from activating the valve to prevent discharging the fire extinguishing agent through the tube, and wherein movement of the switch from the first position to a second position actuates a discharge of the fire extinguishing agent from the container into the engine compartment of the aircraft via the heated tube.

17. The system of claim 16 further comprising:

after the movement of the switch to the first position, the switch is rotatable left or right to the second position to cause the discharge of the fire extinguishing agent into the engine compartment.

18. The system of claim 16 further comprising:

a fire detection system to direct the heating element to heat the tube in response to detecting a fire condition in the engine compartment of the aircraft.

19. The system of claim 16 wherein:

a panel inside a cockpit of the aircraft and including a warning light indicating an engine fire in the aircraft.

20. The system of claim 16 wherein:

the heating element includes electric coils that surround the tube for a length of the tube.

* * * * *